United States Patent
Vachula et al.

(10) Patent No.: US 9,872,268 B2
(45) Date of Patent: Jan. 16, 2018

(54) SYNCHRONOUS WAVEFORM CLOCK SYNCHRONIZATION WITHOUT A SYSTEM CONTROLLER

(71) Applicant: RAYTHEON COMPAY, Waltham, MA (US)

(72) Inventors: George Vachula, Harvard, MA (US);
Mu-Cheng Wang, Acton, MA (US);
Mario Damico, Watertown, MA (US);
Gurpartap Takhar, N. Attleboro, MA (US)

(73) Assignee: RAYTHEON COMPANY, Waltham, MA (US)

( * ) Notice: Subject to any disclaimer, the term of this patent is extended or adjusted under 35 U.S.C. 154(b) by 36 days.

(21) Appl. No.: 15/177,260

(22) Filed: Jun. 8, 2016

(65) Prior Publication Data

US 2017/0359793 A1    Dec. 14, 2017

(51) Int. Cl.
*H04L 7/00* (2006.01)
*H04W 56/00* (2009.01)
*H04W 84/06* (2009.01)

(52) U.S. Cl.
CPC ........ *H04W 56/0065* (2013.01); *H04W 84/06* (2013.01)

(58) Field of Classification Search
CPC ............... H04W 88/04; H04W 56/001; H04W 56/0065; H04W 56/0075; H04W 84/06
See application file for complete search history.

(56) References Cited

U.S. PATENT DOCUMENTS

| 2002/0094797 A1* | 7/2002 | Marshall | H04B 1/713 455/403 |
| 2003/0081603 A1* | 5/2003 | Rune | H04W 72/1289 370/390 |

(Continued)

FOREIGN PATENT DOCUMENTS

| EP | 2 496 030 A1 | 9/2012 |
| EP | 2 819 466 A1 | 12/2014 |
| WO | WO 02/01775 A1 | 1/2002 |

OTHER PUBLICATIONS

International Search Report for corresponding International Application No. PCT/US2017/026671, filed Apr. 7, 2017, International Search Report dated Jul. 13, 2017 and dated Jul. 24, 2017 (4 pgs.).

(Continued)

*Primary Examiner* — Shuwang Liu
*Assistant Examiner* — Sung Ahn
(74) *Attorney, Agent, or Firm* — Lewis Roca Rothgerber Christie LLP

(57) ABSTRACT

A method for synchronizing a time reference of a terminal clock of a terminal transceiver including an antenna and a modem, the method including: transmitting, by the modem, a terminal sync hop to a signal relay in accordance with the time reference; searching, by the modem, for a terminal sync hop return from the signal relay near an estimated terminal sync hop receive time; receiving, by the modem, the terminal sync hop return at a terminal sync hop receive time; searching, by the modem, for a master sync hop return from the signal relay; receiving, by the modem, the master sync hop return at a master sync hop receive time; calculating, by the modem, a time difference between the master sync hop receive time and the terminal sync hop receive time; and adjusting, by the modem, the time reference based on the calculated time difference.

20 Claims, 11 Drawing Sheets

(56) References Cited

U.S. PATENT DOCUMENTS

| | | | | |
|---|---|---|---|---|
| 2012/0201193 A1* | 8/2012 | Sugiyama | .............. | H04B 7/155 |
| | | | | 370/315 |
| 2012/0249366 A1* | 10/2012 | Pozgay | .............. | H04B 7/18571 |
| | | | | 342/354 |
| 2013/0170429 A1* | 7/2013 | Yamamoto | ........ | H04W 52/0203 |
| | | | | 370/315 |
| 2013/0268980 A1* | 10/2013 | Russell | .............. | H04N 21/4122 |
| | | | | 725/75 |
| 2015/0078204 A1* | 3/2015 | Thubert | ................ | H04L 5/0067 |
| | | | | 370/255 |
| 2017/0230925 A1* | 8/2017 | Meiyappan | ....... | H04W 56/0015 |

OTHER PUBLICATIONS

Written Opinion of the International Searching Authority for corresponding International Application No. PCT/US2017/026671, filed Apr. 7, 2017, Written Opinion of the International Searching Authority dated Jul. 24, 2017 (5 pgs.).

* cited by examiner

SYNCHRONOUS WAVEFORM CLOCK SYNCHRONIZATION WITHOUT A SYSTEM CONTROLLER

BACKGROUND

In some communications systems, multiple communicating terminals exchange messages using a shared signal relay. Such systems may include, for example, a satellite communication system where terminals 120 on the ground communicate with a signal relay 100 in orbit as shown, for example in FIG. 1. Communications with the signal relay may be governed by a channel access method such as time division multiple access (TDMA), frequency division multiple access (FDMA) and frequency hopped spread spectrum (FHSS) or direct sequence spread spectrum (DSSS). Such channel access methods generally require the terminals to synchronize their clocks to ensure that, for example, the signal relay receives signals from each of the terminals during their assigned time slots (e.g., without collisions due to overlapping signals from different terminals) or that the terminals and the signal relay hop to the proper frequency at the right time.

When the network of terminals starts up, each of the terminals is likely to have a different local clock reading, resulting in each node's clock or time reference operating with a different phase offset. Therefore, communications systems often include a processing system or system controller (located, for example, at the signal relay) that provides a time reference to which the terminals synchronize their transmit and receive clocks. Generally, in a frequency hopped communications system the system controller transmits synchronization hops (or sync hops) to the various terminals for the terminals to synchronize their receive time references. Terminals transmit synchronization signals (e.g., uplink probes) to the system controller to synchronize their transmit time clocks based on feedback from the system controller. The terminals may include tracking loops to maintain those transmit and receive reference clocks.

However, in some contexts such as in satellite communications in which the system controller may be part of the payload of a satellite, the system controller may add significant hardware to the satellite, thereby increasing both hardware and launch costs. The synchronization method outlined here allows synchronous communication through a non-processing relay (e.g., a satellite communications system without a system controller on board the satellite).

SUMMARY

Embodiments of the present invention are directed to systems and methods for performing clock synchronization without using a system controller.

According to one embodiment, a method for synchronizing a time reference of a terminal clock of a terminal transceiver including an antenna and a modem, the method including: transmitting, by the modem, a terminal sync hop to a signal relay in accordance with the time reference; searching, by the modem, for a terminal sync hop return from the signal relay near an estimated terminal sync hop receive time; receiving, by the modem, the terminal sync hop return at a terminal sync hop receive time; searching, by the modem, for a master sync hop return from the signal relay; receiving, by the modem, the master sync hop return at a master sync hop receive time; calculating, by the modem, a time difference between the master sync hop receive time and the terminal sync hop receive time; and adjusting, by the modem, the time reference based on the calculated time difference.

The adjusting the time reference based on the calculated time difference may include changing, in a same direction, both a transmit time of the terminal sync hop and an estimated terminal sync hop receive time by the time difference.

After adjusting the time reference based on the calculated time difference, the terminal sync hop receive time may be aligned with the master sync hop receive time.

The method may further include estimating a range to the signal relay by: calculating a terminal sync hop delay between a transmit time of the terminal sync hop and the terminal sync hop receive time; and dividing the terminal sync hop delay by the speed of light.

The method may further include adjusting the time reference when a range between the terminal and the signal relay changes by: detecting a change in a terminal sync hop delay where sync hop delay is the time from when the sync hop is transmitted by the terminal to the time when the same sync hop is received by the terminal; and adjusting the time at which the terminal sync hop is transmitted and the estimated terminal sync hop receive time, in opposite directions, by half the change in the terminal sync hop delay.

The searching for the terminal sync hop return may occur before the searching for the master sync hop return.

The searching for the master sync hop return may occur before the searching for the terminal sync hop return.

The searching for the master sync hop return may occur concurrently with the searching for the terminal sync hop return.

According to one embodiment of the present invention, a modem includes: a network communication interface; a terminal time tracking loop configured to track a terminal time reference; a master time tracking loop configured to track a master time reference; a signal processor coupled to memory, the memory storing instructions that, when executed by the signal processor, cause the signal processor to: transmit, by the network communication interface, a terminal sync hop in accordance with a time reference; search for a terminal sync hop return near an estimated terminal sync hop receive time; receive, by the network communication interface, the terminal sync hop return at a terminal sync hop receive time; track the terminal time reference using the terminal time tracking loop in accordance with the terminal sync hop receive time; search for a master sync hop return; receive, by the network communication interface, the master sync hop return at a master sync hop receive time; track the master time reference using the master time tracking loop in accordance with the master sync hop receive time; calculate a time difference between the master sync hop receive time and the terminal sync hop receive time; and adjust the terminal time reference tracked by the terminal tracking loop based on the calculated time difference.

The signal processor may be configured to adjust the master time reference based on the calculated time difference by changing, in a same direction, both a transmit time of the terminal sync hop and the estimated terminal sync hop receive time.

After the terminal time reference is adjusted, the terminal time reference and the master time reference may be aligned.

The modem may receive the terminal sync hop return and the master sync hop return from a signal relay, and wherein the memory may further store instructions that, when executed by the signal processor, cause the signal processor to estimate a range to the signal relay by: calculating a terminal sync hop delay between a transmit time of the terminal sync hop and the terminal sync hop receive time; and dividing the terminal sync hop delay by the speed of light.

The memory may further store instructions that, when executed by the signal processor, cause the signal processor to adjust the terminal time reference when a range between the terminal and the signal relay changes by: detecting a change in a terminal sync hop delay between a transmit time of the terminal sync hop and the terminal sync hop receive time; and adjusting the time at which the terminal sync hop is transmitted and the estimated terminal sync hop receive time, in opposite directions, by half the change in the terminal sync hop delay.

The modem may be configured to search for the terminal sync hop return before it searches for the master sync hop return.

The modem may be configured to search for the terminal sync hop return after it searches for the master sync hop return.

The modem may be configured to search, concurrently, for both the terminal sync hop return and the master sync hop return.

According to one embodiment of the present invention, a communication system includes: a signal relay; a master modem comprising a master network communication interface, a master time tracking loop configured to track a master time reference, and a master signal processor coupled to first memory, the first memory storing instructions that, when executed by the master signal processor cause the master signal processor to: transmit to the signal relay, by the master network communication interface, a master sync hop in accordance with the master time reference; search for a master sync hop return near an estimated master sync hop receive time; receive from the signal relay, by the master network communication interface, the master sync hop return at a master modem master sync hop receive time; and track the master time reference based on the master sync hop receive time; and a client modem comprising a client network communication interface, a client time tracking loop configured to track a client time reference, a master time tracking loop configured to track the master time reference, and a client signal processor coupled to second memory, the second memory storing instructions that, when executed by the client signal processor cause the client signal processor to: transmit to the signal relay, by the client network communication interface, a client sync hop in accordance with the second time reference; search for a client sync hop return near an estimated client sync hop receive time; receive from the signal relay, by the client network communication interface, the client sync hop return at a client sync hop receive time; track the second time reference based on the second sync hop receive time; search for the master sync hop; receive from the signal relay the master sync hop at a client modem master sync hop receive time; track the master time reference based on the client modem master sync hop receive time; calculate a time difference between the client sync hop receive time and the client modem master sync hop receive time; and adjust the second time reference based on the calculated time difference.

The client signal processor may be configured to adjust the client time reference based on the calculated time difference by changing, in a same direction, both a transmit time of the client sync hop and the estimated client sync hop receive time.

The first memory may further store instructions that, when executed by the master signal processor, cause the master signal processor to: detect a change in a master sync hop delay between a transmit time of the master sync hop and the master modem master sync hop receive time; and adjust a transmit time of the master sync hop and the estimated master sync hop receive time, in opposite directions, by half the change in the master sync hop delay.

The client modem may be configured to adjust the client time reference based on the calculated time difference by changing, in a same direction, both a transmit time of the client sync hop and the estimated client sync hop receive time.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
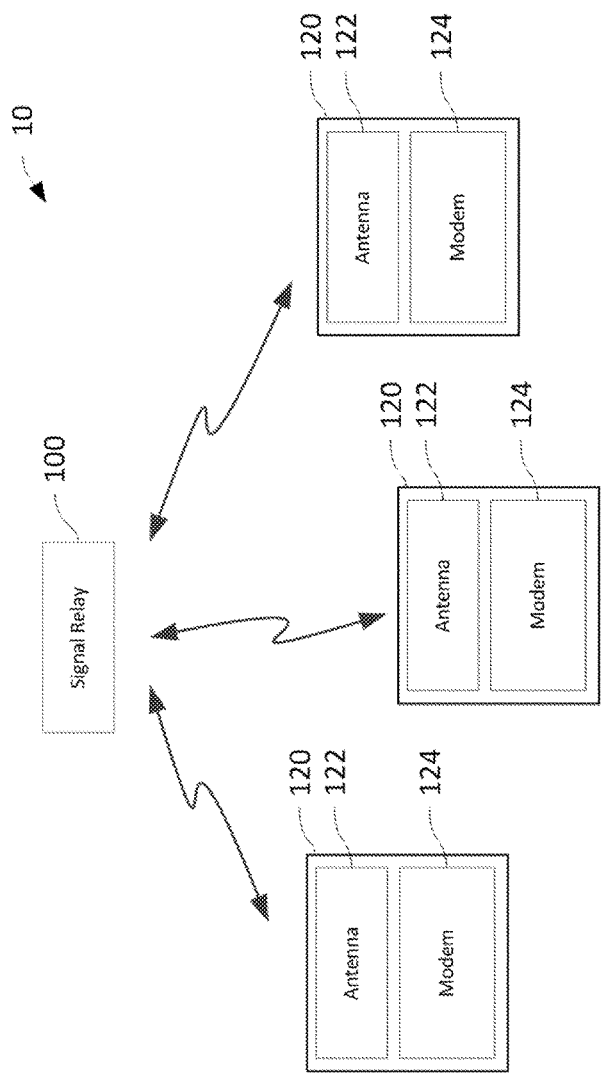
FIG. 1 is a schematic block diagram of a communication system including a signal relay and a plurality of terminals in communication with the signal relay.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Embodiments of the present invention are directed to communications systems configured to perform transmit and receive clock synchronization without the use of a system controller that provides a time reference for the system to which users synchronize.

FIG. 1 is a schematic block diagram of a communication system including a signal relay and a plurality of terminals 120 in communication with the signal relay 100.

Aspects of embodiments of the present invention are directed to methods that allow one of several terminals 120 in a network 10 operating over a signal relay (e.g., a transponder payload) 100 to establish a time reference to which the remaining terminals 120 can synchronize, effectively providing the synchronization function that would otherwise be provided by a system controller (SC) located at the signal relay 100, even when the terminals may be operating out of phase with one another. As such, aspects of embodiments of the present invention allow a network to be created and maintained solely by participating terminals 120 without a system controller (e.g., without including a system controller in the signal relay 100 or a ground based system controller). This capability allows embodiments of the present invention to establish mesh networks over any transponder based relay or payload. In addition, the method does not require an external time synchronization source such as a GPS signal and can therefore be used in a GPS-denied environment.

In one embodiment, the terminal that first establishes the reference time becomes the master time source or master terminal 120. The master modem time reference may be independent of GPS time and may be relatively stable (e.g., by using a Rubidium time/frequency source). The remaining terminals may be referred to as clients (or client terminals) 120 that synchronize to the master's time reference through the signal relay 100. The synchronization may be performed by applying a time division multiplex (TDM) transmission structure on the synchronous waveform, thereby allowing each modem to transmit in its assigned time slot and to be received by every other modem in the network when the reference time is properly synchronized in the network.

Some aspects of embodiments of the present invention also account for platform motion, thereby allowing communication between terminals, some or all of which may be on independently moving platforms (e.g., vehicles).

In addition, embodiments of the present invention may be implemented using existing waveform features (e.g., the existing synchronization hops). Therefore, embodiments of the present invention utilize few additional modem capabilities relative to existing modems, and therefore do not require significant increased modem complexity and reduce or minimize incremental modem cost.

For the sake of convenience, embodiments of the present invention will be described based on some assumptions as discussed below. However, embodiments of the present invention are not limited thereto and aspects of the present invention also cover circumstances in which one or more of these assumptions are relaxed.

For the purposes of discussion, below, all terminals are assumed to operate on a single satellite beam. However, in other embodiments, multiple beams may be used when the payload delay between the multiple beams is same.

In some embodiments, the number of terminals 120 in the network 10 is limited based on tradeoffs between synchronization resource overhead (sync hop slot usage for each terminal) and communication resources (hops or time slots assigned to data). In one embodiment, the network 10 includes fifteen terminals. In other embodiments of the present invention, the number of terminals may vary based on the communication requirements (e.g., TDM allocation to each terminal). Furthermore, in some embodiments of the present invention, additional groups of terminals may form networks over the same relay by using available, non-overlapping frequency bands. For example, in an FDM fashion, another network of terminals could synchronize their clocks independently of the first network of terminals. However, these additional networks may reduce the hopping bandwidth of each network unless the patterns were selected in a way so as to avoid overlap.

In the embodiments discussed below, parameters such as synchronization channel frequencies and sync hop locations within a frame are pre-defined and known to each terminal before the network starts up (e.g., these settings may be provided during initial setup, or later via a configuration file or a parameter update message sent to all terminals in the network). In addition, a time division multiplex (TDM) structure and assignment is established (e.g., static) across a frame or some number of frames (e.g., one could define a TDM cycle larger than a frame) for each terminal's communication data. This may also be predefined and fixed or may be dynamically assigned later.

For example, each terminal 120 may be assigned a sync hop slot during which it is permitted to transmit sync hops for purposes of synchronization. In addition, one or more sync hop slots may be reserved for the master terminal so that only the master terminal transmits during these master sync hop slots.

Embodiments of the present invention described below may use any of a number of techniques for establishing a master time reference modem. In one embodiment, a master terminal alternate or takeover hierarchy is pre-defined and known to all terminals when the master is not available (e.g., disabled or not in range). Alternatively, the terminals may implement an algorithm for automatically identifying a new master terminal.

However, embodiments of the present invention do not need to assign the master function to a particular terminal and, instead, an algorithm performed by each of the terminals allows an active terminal to establish the time reference for the mesh network.

In one embodiment, the modem 124 of each terminal 120 sends, through a corresponding antenna 122, various types of synchronization hops (e.g., coarse, fine, and extra fine) in order to refine its synchronization with the master terminal. In one embodiment, the sync hops are sent at a rate of 12.5 Hz, with one coarse, one fine, and one extra fine sync hop sent per terminal (including the master) during every four frames. In some embodiments of the present invention, the number of sync hop overhead slots may be reduced by sending sync hops at a lower rate, assigning only one sync hop slot to each client terminal so that each client terminal reuses the same slot for its own coarse, fine, and extra fine sync hops, while the master retains three slots for its coarse, fine, and extra fine sync hops. Each terminal may reserve three slots for receiving the coarse, fine, and extra fine sync hops from the master terminal.

Define n to be the total number of terminals in the network, $\mu$ to be the number of slots reserved to send synch hops per terminal during every four frames ($1 \le \mu \le 3$), and $\alpha$ is the total number of synch hops required for all terminals per frame. Although each terminal can retain 1, 2, or 3 slots during every four frames, the master always retains 3 slots for its coarse, fine, and extra fine sync hops. Then, $\alpha$ can be calculated as following:

$$\alpha = \left\lceil \frac{3(\text{reserved for the master}) + \mu(\text{reserved for a terminal})m}{4(\text{every 4 frames})} \right\rceil.$$

Table 1 shows the total number of synch hops required per frame when µ=1, 2, and 3. The more number of slots reserved to send synch hops per terminal, the less number of hops available to deliver data. The number of terminals allowable is limited based on tradeoffs between synchronization resource overhead (sync hop slot usage for each terminal) and communication resources (hops assigned to data).

TABLE 1

Total number of synch hops required per frame

| Number of Terminals n | Total Number of Sync Hops/Frame α | | |
|---|---|---|---|
| | 3 Hops/Terminal During Every 4 Frames | 2 Hops/Terminal During Every 4 Frames | 1 Hop/Terminal During Every 4 Frames |
| 1 | 2 = ⌈(3 + 3 * 1)/4⌉ | 2 = ⌈(3 + 2 * 1)/4⌉ | 1 = ⌈(3 + 1 * 1)/4⌉ |
| 3 | 3 = ⌈(3 + 3 * 3)/4⌉ | 3 = ⌈(3 + 2 * 3)/4⌉ | 2 = ⌈(3 + 1 * 3)/4⌉ |
| 5 | 5 = ⌈(3 + 3 * 5)/4⌉ | 4 = ⌈(3 + 2 * 5)/4⌉ | 2 = ⌈(3 + 1 * 5)/4⌉ |
| 7 | 6 = ⌈(3 + 3 * 7)/4⌉ | 5 = ⌈(3 + 2 * 7)/4⌉ | 3 = ⌈(3 + 1 * 7)/4⌉ |
| 9 | 8 = ⌈(3 + 3 * 9)/4⌉ | 6 = ⌈(3 + 2 * 9)/4⌉ | 3 = ⌈(3 + 1 * 9)/4⌉ |
| 11 | 9 = ⌈(3 + 3 * 11)/4⌉ | 8 = ⌈(3 + 2 * 13)/4⌉ | 4 = ⌈(3 + 1 * 13)/4⌉ |

In one embodiment, the parameters include a specification of the structure of the time division multiplexed communications. This specification includes the modulation used for each terminal, where the modulation may be based on the size and expected traffic requirements of the network 10. Embodiments of the present invention are not limited to any particular waveform modulation, and any waveform modulation consistent with frequency hopping or any TDM waveform can be used without restriction. This specification may also determine the number of hops for each terminal in the TDM structure.

In some embodiments of the present invention, the number of slots (or hops) assigned to each terminal is fixed. For example, if there are ten terminals in a network and there are 300 communication hops per frame, then each terminal could be assigned 30 slots per frame.

In other embodiments of the present invention, the number hops may be dynamically adjusted based on communication bandwidth required. For example, terminals with larger amounts of data to transmit may be allocated more slots in each frame, whereas terminals with lower data bandwidth requirements may be allocated fewer slots in each frame. In addition, if more terminals are added to the network or if more bandwidth is required for some terminals, the TDM cycle time may be modified to include two or more frames.

In one embodiment of the present invention, each modem 124 includes two time tracking loops: one for tracking own sync hops (similar to a tracking loop used in a standard modem for receive time tracking); and one for tracking the master terminal's virtual time reference. The tracking loop may include a discriminator to provide an error signal, a filter (e.g., a Kalman filter), and a feedback mechanism to adjust the time based on the filtered error signal. However, embodiments of the present invention are not limited thereto. Each modem 124 is configured for full duplex communication.

Figure 2:
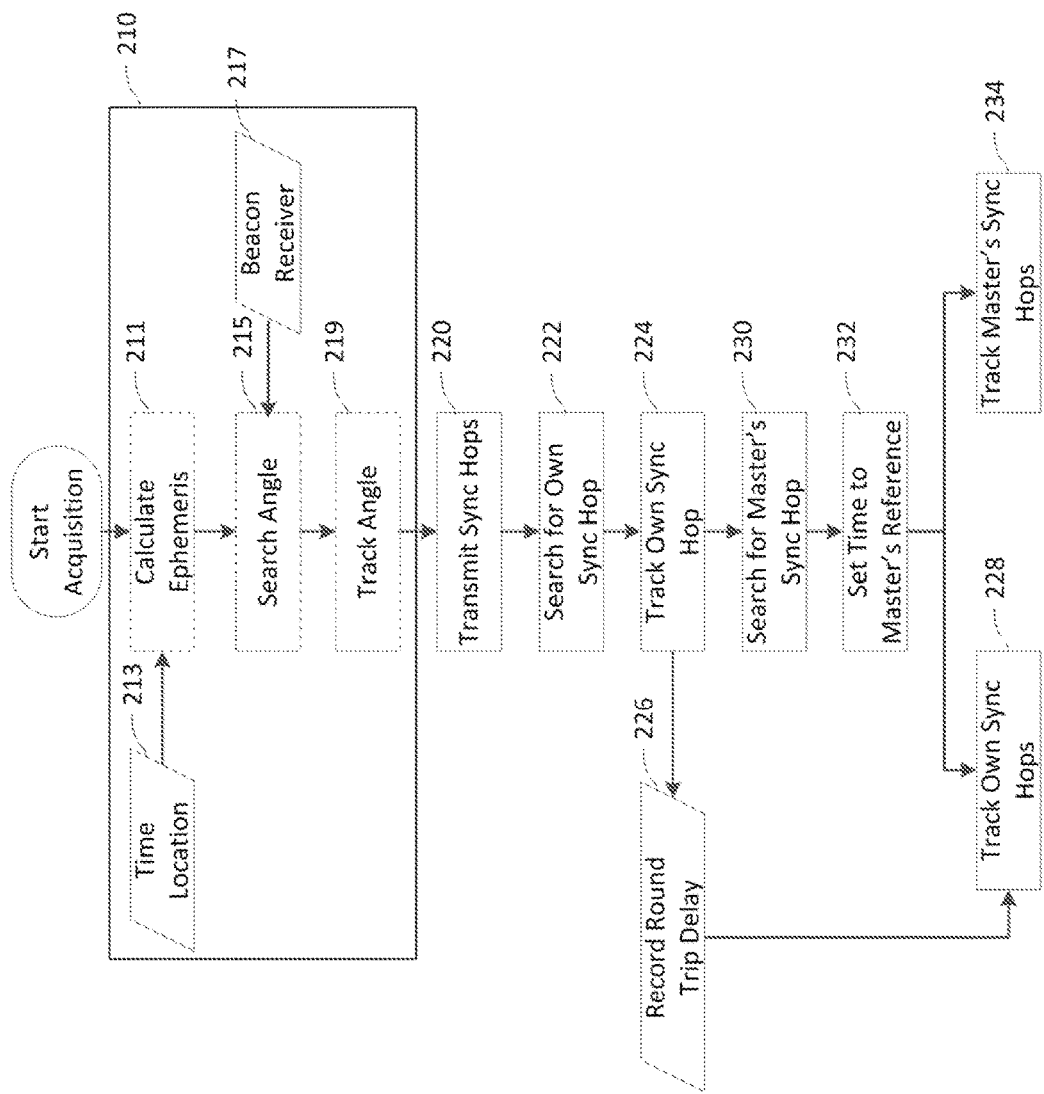
FIG. 2 is a flowchart illustrating a method performed by a client terminal to track its own time reference and the time reference of a master terminal according to one embodiment of the present invention.

FIG. 2 is a flowchart illustrating a method performed by a second terminal 120B (or terminal B) to track its own time reference and the time reference of a master terminal (e.g., the first terminal 120A or terminal A) according to one embodiment of the present invention.

Figure 3A:
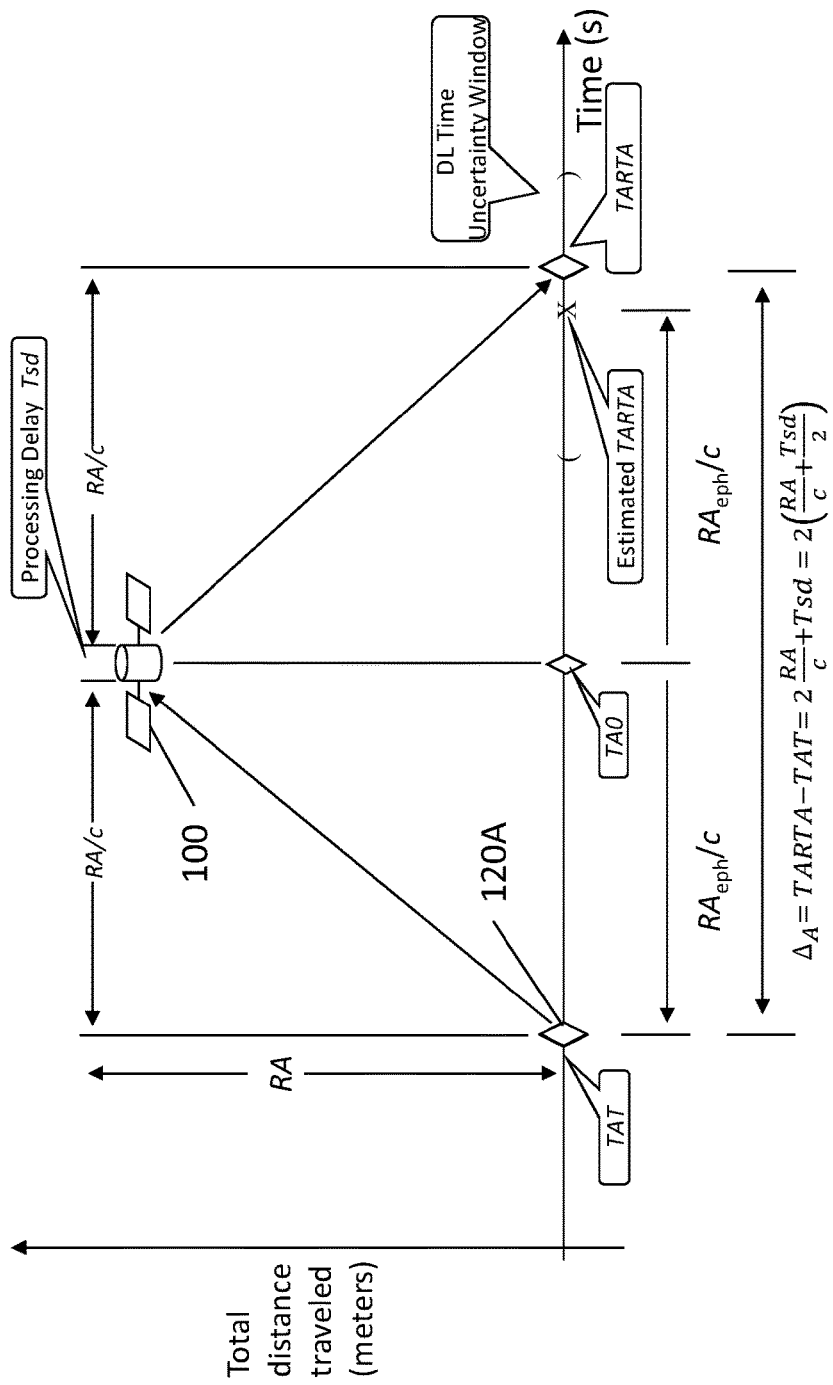
FIG. 3A is a schematic diagram illustrating a synchronization hop communication between a terminal and a signal relay according to one embodiment of the present invention.

FIG. 3A is a schematic diagram illustrating a synchronization hop communication between a terminal 120A and a signal relay 100 according to one embodiment of the present invention. The y-axis in FIG. 3A corresponds to a line-of-sight distance or range or total distance traveled by the signal RA (e.g., in meters) between terminal 120A and the signal relay 100 and the x-axis corresponds to time (e.g., in seconds).

Referring to FIGS. 2 and 3A, at time TAT, a terminal (e.g., a first terminal 120A or terminal A), may initially establish contact with a signal relay in operation 210. For example, when the network 10 is a satellite communications network, the terminal using a directional antenna may initially calculate ephemeris in operation 211 based on time and location data 213. The terminal may then identify a search angle in operation 215 based on the satellite ephemeris, search for and detect the presence of a signal from a beacon receiver 217, for example, and then steer the antenna 122 to track the angle to the satellite in operation 219. However, in other embodiments of the present invention, such as in the context of a substantially omnidirectional wireless communication system (e.g., a cellular network), an appropriate corresponding technique may be used in operation 210 to establish initial contact with a signal relay 100.

In operation 220, the terminal 120 transmits a sync hop signal (e.g., a coarse sync hop signal) to the signal relay 100. Terminal A is at a range RA from the signal relay 100. Assuming that the signal propagates at the speed of light (c), the sync hop arrives at the relay 100 after RA/c seconds. The signal relay 100 may introduce processing delay Tsd and then relay the sync hop signal transmitted by the terminal. In operation 222, the terminal searches for the sync hop return within a downlink (DL) uncertainty window around an estimated time TARTA. In one embodiment, the sync hop return time TARTA is estimated based on a satellite ephemeris calculation. The uncertainty window size depends on the uncertainty of the location of the terminal and the uncertainty of the terminal's local clock (e.g., GPS time or Greenwich Mean Time). The terminal 120 receives and tracks the signal at time TARTA in operation 224. Assuming that the terminal has not moved a significant distance during this time (e.g., that the range RA is substantially the same), the distance to the terminal is still RA and therefore the sync hop return also takes RA/c seconds to arrive at terminal 120. The total time elapsed $\Delta_A$ between the terminal transmitting the sync hop at time TAT and return receive time TARTA is therefore:

$$\Delta_A = TARTA - TAT = 2\frac{RA}{c} + Tsd = 2\left(\frac{RA}{c} + \frac{Tsd}{2}\right) \Delta_A = TARTA - TAT = 2\frac{RA}{c} + Tsd = 2\left(\frac{RA}{c} + \frac{Tsd}{2}\right)$$

which includes both delay due to range and delay due to signal relay 100 processing. The terminal records the round trip delay time in operation 226 and uses this information to track its own sync hops in operation 228. In operation 230, the terminal searches for a master's sync hops, adjusts the time to the master's time reference in operation 232, and begins tracking the master's sync hops in operation 234. In one embodiment, a client terminal tracks both its own sync hops and the current master's sync hops and a master tracks only its own sync hops (and not the sync hops of other terminals).

Rearranging the above equation gives a formula for a terminal to estimate its range from the signal relay:

$$\frac{\hat{RA}}{c} = \frac{(TARTA - TAT) - Tsd}{2} = \frac{\Delta_A - Tsd}{2}$$

A terminal 120 time reference (or virtual time of day reference) TA0 can be defined as the midpoint of the delay through the signal relay 100, which may be estimated based on the below formula:

$$\widehat{TA0} = \frac{(TARTA + TAT)}{2}$$

This time reference TA0 may be thought of as a virtual time reference because, in some embodiments, the signal relay 100 does not perform any waveform processing analogous to a typical processing payload or system controller.

If the time reference TA0 is to be tracked to a greater degree of accuracy, then the calculated reference time can be refined by repeating the process using the fine and/or extra fine sync hops.

As such, in one embodiment, the terminal 120 can track its own sync hops by calculating the time reference TA0 by taking the total time elapsed $\Delta_A$, dividing it by 2 and advancing its transmission time to TAT. In other words, Terminal A transmits $\Delta_A/2$ before TA0 so that its signal reaches the relay at time TA0 (it advances its transmit time relative to TA0 by $\Delta_A/2$).

In other embodiments of the present invention, another point in time is used as the time reference instead of the time at which the signal reaches the signal relay. For example, in one embodiment, the time at which the initial sync hop was transmitted at time TAT is used as a time reference.

Figure 3B:
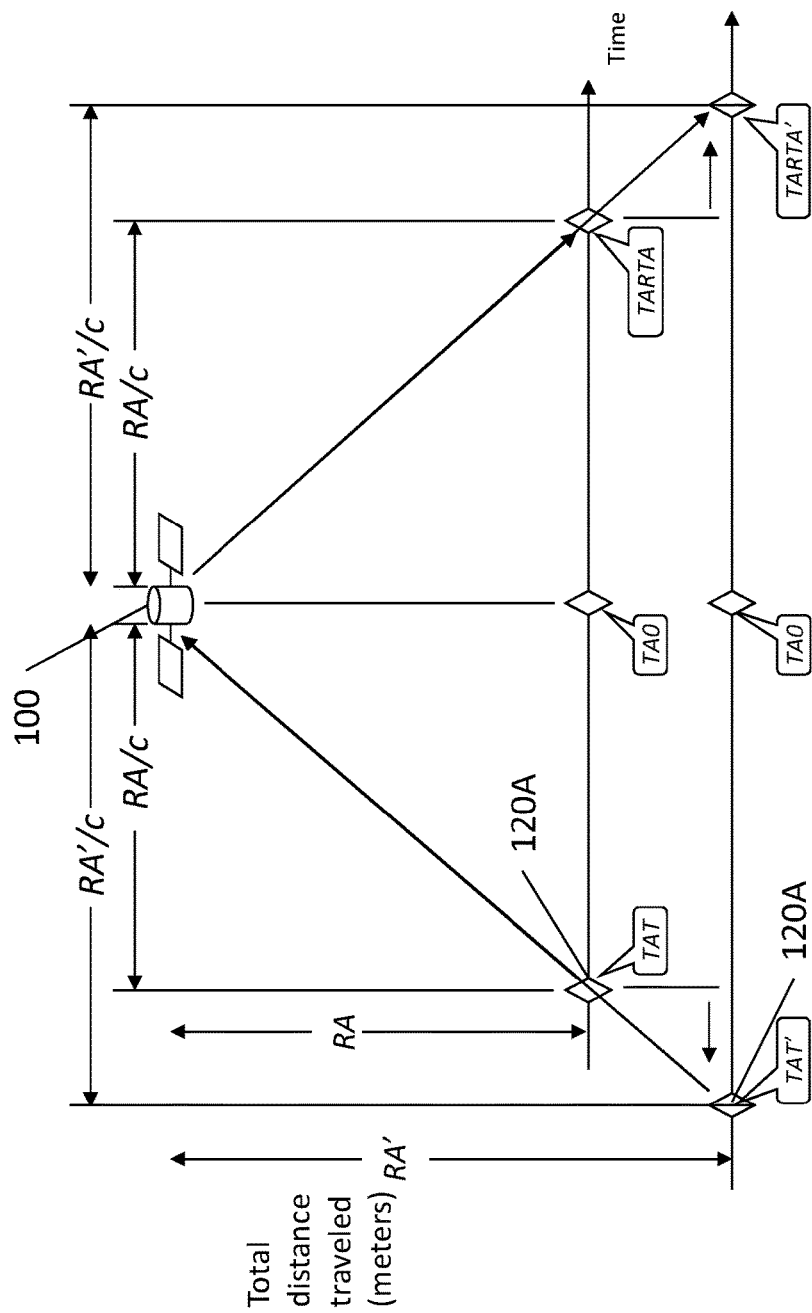
FIG. 3B is a schematic diagram illustrating the adjustment of the tracker when the distance or range between a terminal and the signal relay 100 changes because, for example, the terminal is on a moving platform such as a vehicle.

FIG. 3B is a schematic diagram illustrating the adjustment of the tracker when the distance or range between a terminal and the signal relay 100 changes because, for example, the terminal is on a moving platform such as a vehicle. For example, when the distance between terminal A and the relay changes from RA to RA', the modem 124 adjusts the transmit time TAT and the expected receive time TARTA in equal and opposite directions in order to maintain the reference time TA0. When range increases (decreases), transmit time is advanced (retarded) and receive time is retarded (advanced). This tracker tracks out changes in time due to a change in range and stabilizes that terminal's time reference (TA0). This includes the master terminal, which stabilizes its master virtual time reference relative to changes in its range from the signal relay. In addition, each of the client terminals does the same for any changes in time due to its change in range, thereby stabilizing its estimate of its time reference even as the range between the terminal 120 and the signal relay 100 changes over time (for example, when the terminal 120 platform is moving).

In more detail, when the range changes, the delay changes by 2 (RA'/c−RA/c). Therefore, in order to maintain the reference time TA0, the transmit time TAT is shifted by RA'/c−RA/c to TAT':

$$TAT'=TAT-RA'/c+RA/c$$

and the expected receive time TARTA is also shifted by RA'/c−RA/c:

$$TARTA'=TARTA+RA'/c-RA/c$$

Figure 4A:
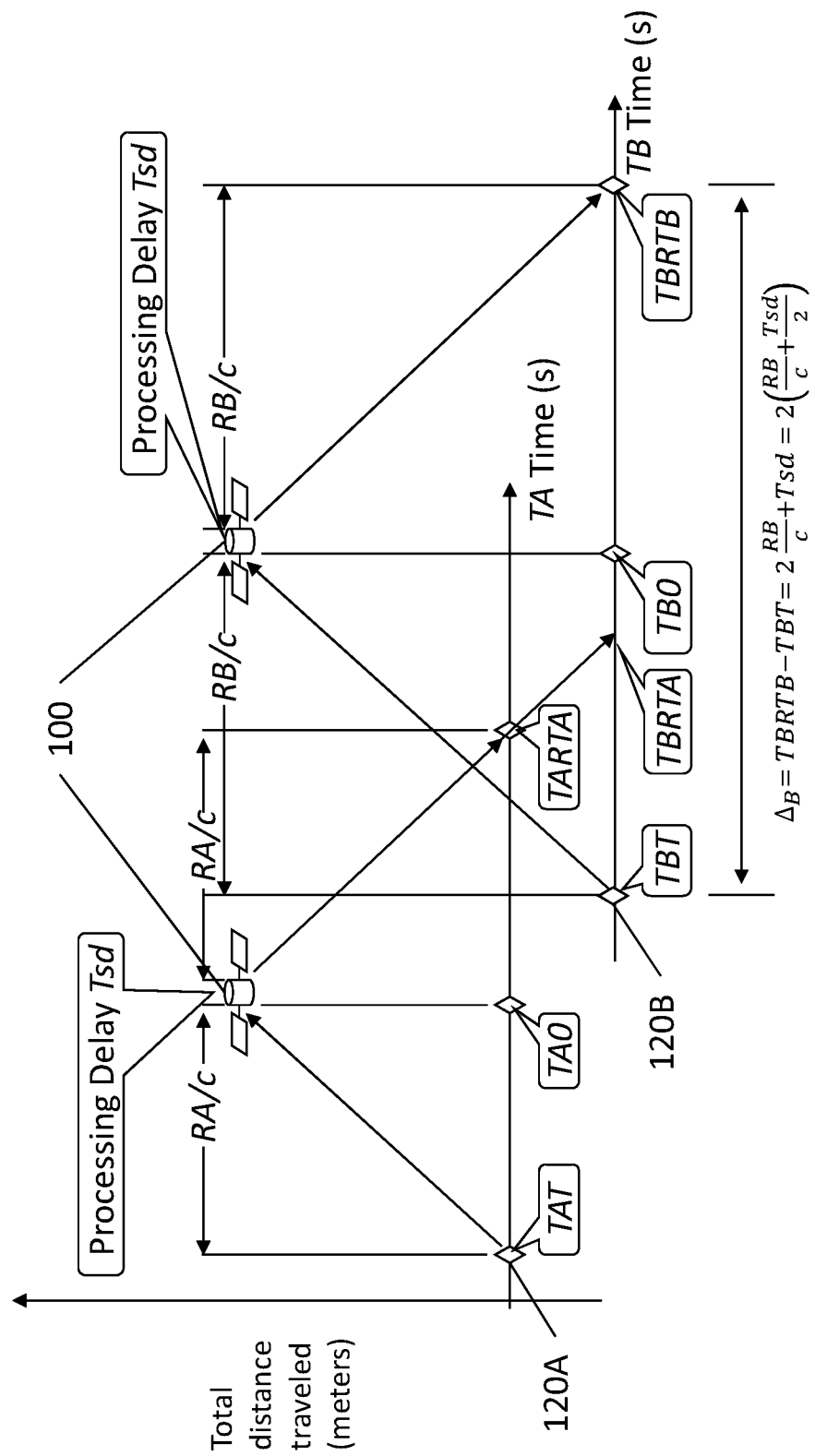
FIG. 4A is a schematic diagram illustrating misaligned terminal clocks in a communication system without a system controller.

FIG. 4A is a schematic diagram illustrating misaligned terminal clocks in a communication system without a system controller. Assuming, as discussed above, that a master terminal (e.g., terminal A) has been identified and is providing a time reference by transmitting its sync hops to the signal relay 100, a second terminal's time can be synchronized to the master's time reference using capabilities of existing modems with little change to the modem's control logic and with little change to the modem's hardware.

Referring to FIG. 4A, the reference clocks TA0 and TB0 of terminals A and B, respectively, are initially not aligned (e.g., TA0 and TB0 are spaced apart along the time axis in FIG. 4A).

As shown in FIG. 4A, terminal A and terminal B both send, detect, and track their own sync hops in a manner similar to that shown in FIG. 3A. As seen in FIG. 4A, terminal A transmits a sync hop at time TAT, receives a return of its own sync hop from the signal relay 100 at time TARTA and identifies a reference clock at TA0 based on the midpoint between TAT and TARTA. Similarly, terminal B transmits its own sync hop at time TBT, receives the return of its sync hop from the same signal relay 100 at time TBRTB, and identifies a reference clock at time TB0. (Although the signal relay 100 is shown twice in FIG. 4A, this is intended to be the same signal relay 100 at different points in time, thereby illustrating the misalignment of terminal A and terminal B.) The sync hops transmitted by terminal A and terminal B should be observable by both terminal A and terminal B even though time is not aligned (as seen in FIG. 4A, the time references TA0 and TB0 of terminals A and B are different). As such, terminal B searches for and receives terminal A's return sync hop at time TBRTA. Each client terminal 120, such as terminal B, finds the master terminal's sync hops to align its time reference to the master terminal's time reference and tracks both its own time reference and the master terminal's time reference to account for any time drift. The client terminals can do this because the client terminals know (e.g., are preconfigured to know) the fixed difference in time between its own and the master's sync hops.

Figure 4B:
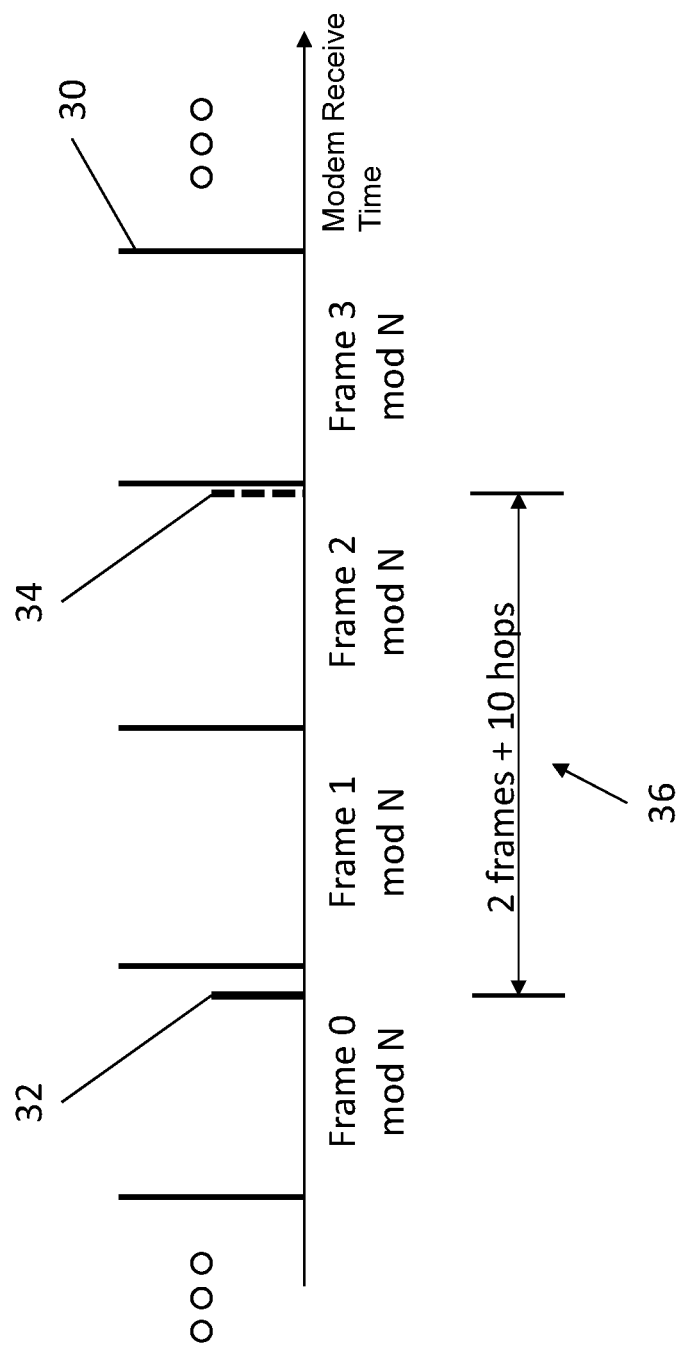
FIG. 4B is a schematic diagram illustrating a client receiving a master sync hop and a client sync hop in different frames before alignment according to one embodiment of the present invention.

FIG. 4B is a schematic diagram illustrating one example of a client receiving a master sync hop 32 and a client sync hop 34 in different frames before alignment (or synchronization) according to one embodiment of the present invention. The horizontal axis in FIG. 4B corresponds to time and FIG. 4B illustrates four frames: frame 0 mod N, frame 1 mod N, frame 2 mod N, and frame 3 mod N, where N is a positive integer that can be configured for the network based on network size, bandwidth requirements of the network terminals, etc. Frame strobes signals 30 mark the start of each frame and may be used by the terminals 120 to control time dependent internal processing. The client terminals 120 can identify the master terminal's sync hops 32 because the sync hop location is a parameter that is pre-configured and known by the client terminals 120. The fixed time relationship between the master's sync hop location and the client's sync hop location is therefore also known, based on the parameters. When the modem can receive both of these sync hops and maintain the known, fixed time relationship between them, the waveform is synchronized in a manner substantially similar to that used with existing geosynchronous satellite communication systems that include a system controller. In the example shown in FIG. 4B, the terminal receives a master sync hop 32 (shown as a thick solid line) from a master terminal at hop 300 during frame 0 mod N, and receives its own sync hop 34 (shown as a thick dashed line) during hop 310 frame 2 mod N. Therefore, the master 32 and client 34 sync hops are 2 frames+10 hops apart (illustrated by the time difference 36 shown in FIG. 4B).

When the detected difference in time between the master sync hop and the client sync hop matches the previously set fixed time relationship (e.g., 10 hops), then the client's time reference is aligned with the master's time reference. On the other hand, if the detected difference in time does not match the fixed time relationship, then the client adjusts its time reference by the difference between the detected difference and the fixed time relationship in order to synchronize with the master time reference.

As used herein, the term "hop" (or "sync hop") refers to a time slot that can carry a synchronization signal.

Figure 5A:
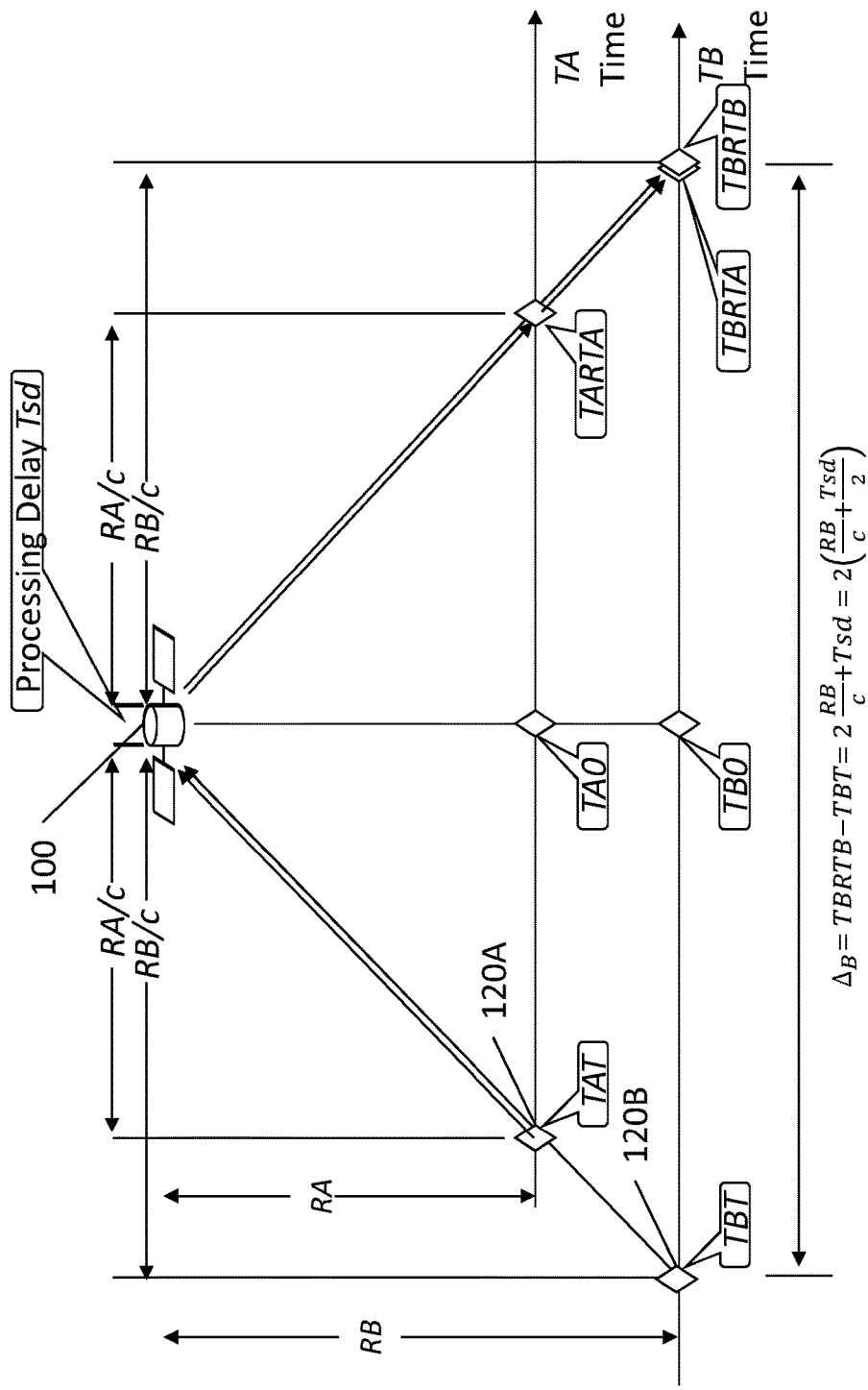
FIG. 5A is a schematic diagram illustrating aligned terminal clocks according to one embodiment of the present invention, where the synchronization signal is transmitted by the master.
Figure 5B:
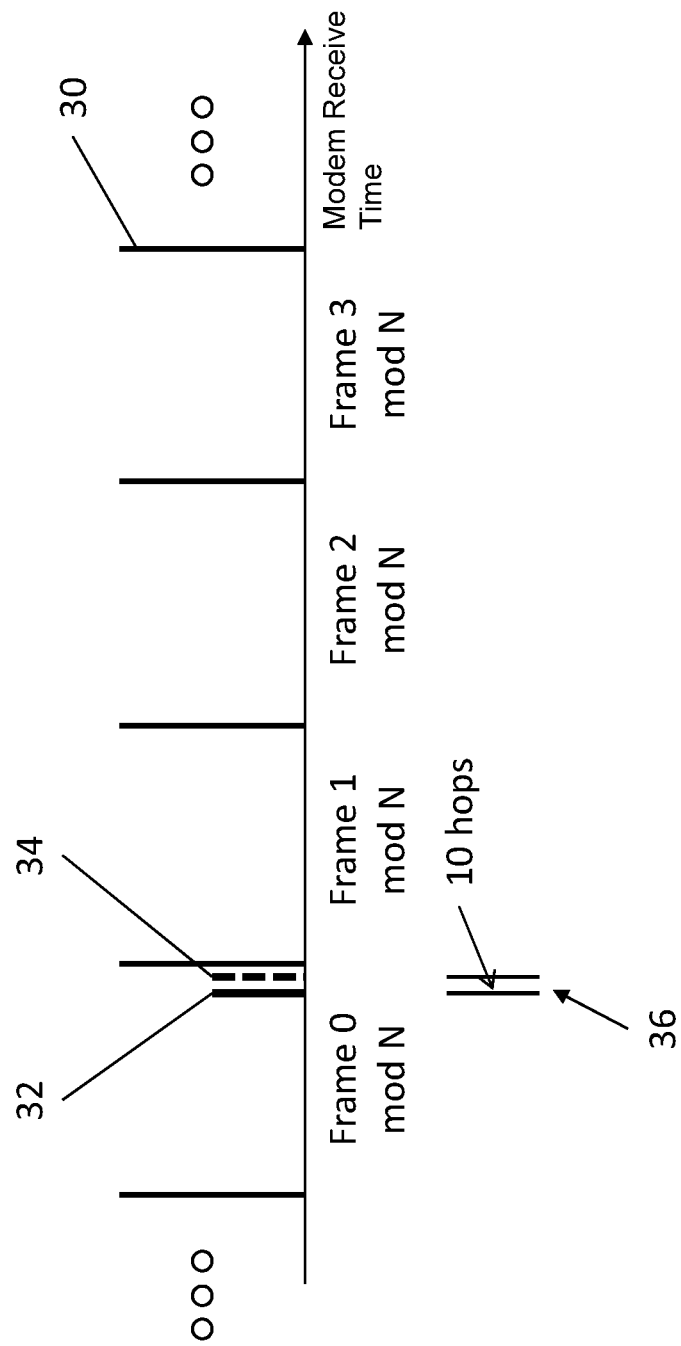
FIG. 5B is a schematic diagram illustrating the receiving of a master sync hop and a client sync hop by a client after alignment according to one embodiment of the present invention.

FIG. 5A is a schematic diagram illustrating aligned terminal clocks in a communication system according to one embodiment of the present invention, where the communication system excludes a system controller. FIG. 5B is a schematic diagram illustrating the receiving of a master sync hop and a client sync hop by a client after alignment (or synchronization) according to one embodiment of the present invention.

In operation 232 (FIG. 2), Terminal B aligns its clock with Terminal A by adjusting its transmit time TBT such that TBRTB (the time at which terminal B receives its own sync hop) and TBRTA (the time at which terminal B receives terminal A's sync hop) are offset in time by the number of hops defined in the pre-configured parameters (e.g., 10 hops), while maintaining the relationship between TBT, TB0, and TBRTB. Terminal B knows the fixed delta time (e.g., the time between the slots in the prearranged TDM schedule) between its own sync hop and master sync hops based on the pre-configured parameters, as discussed above in the example of FIG. 5B. Therefore, terminal B can align its own time reference TB0 with the master time reference TA0 (e.g., so that the sync hops for the same frame from terminal A and terminal B both arrive at the signal relay 100 during their allotted slots in the same frame) by driving the measured time difference to that integer number of hops, as illustrated in FIG. 5B.

Time adjustments to the client terminal's tracking loop for tracking the master's sync hops are made so that, when drift occurs, both transmit and receive times are moved in the same direction (e.g., so that TB0 is moved). When drift causes the relative time to retard, the client terminal's transmit and receive times are retarded. Similarly, when drift causes the relative time to advance, then the client terminal's transmit and receive times are advanced. Therefore, this tracker maintains the relationship between the master and terminal references TA0 and TB0 by maintaining the known, fixed time difference between sync hops.

For example, in operation 232, terminal B adjusts the transmit time TBT so that it receives the return of the sync hop TRBTB at the proper time in relation to receiving the return of the sync hop from terminal A TBRTA (e.g., at the TDM assigned time slot during the same frame), as shown in FIG. 5A and FIG. 5B. In one embodiment, terminal B tracks its own sync hop to account for its range RB (e.g., the total distance traveled by the signal) to the signal relay 100 and calculates the time TBT to transmit the sync hop by subtracting $\Delta_B$ from the arrival time of TRBTA, where $\Delta_B$ is calculated in a manner similar to the calculation of $\Delta_A$:

$$\Delta_B = TBRTB - TBT = 2\frac{RB}{c} + Tsd =$$

$$2\left(\frac{RB}{c} + \frac{Tsd}{2}\right)\Delta_A = TARTA - TAT = 2\frac{RA}{c} + Tsd = 2\left(\frac{RA}{c} + \frac{Tsd}{2}\right)$$

As shown in FIG. 5A and FIG. 5B, after alignment, terminal B receives both the sync hop from terminal A and its own sync hop during the same frame and the time reference TB0 of terminal B is synchronized with the time reference TA0 of terminal A. In addition, as the modem 124 of terminal B tracks the difference between its own and the master terminal's sync hops, it may detect drifts in the master's time reference based on the arrival time TBRTA of terminal A's sync hops. Accordingly, terminal B adjusts its sync hop transmit time TBT and expected sync hop receive time TBRTB so that TBRTB remains aligned with TBRTA and therefore TB0 remains aligned with TA0.

When synchronized, each client terminal's transmissions hit the master's virtual time reference (the midpoint of the relay delay) at the proper time such that the signals from each client arrive at the signal relay separated in a TDM fashion (e.g., without overlap). All terminals can then transmit in their time slots without interference with one another.

In various embodiments of the present invention, the client terminal may attempt to synchronize with the time reference of the master terminal in a variety of different ways, some of which are described in more detail below.

Figure 6A:
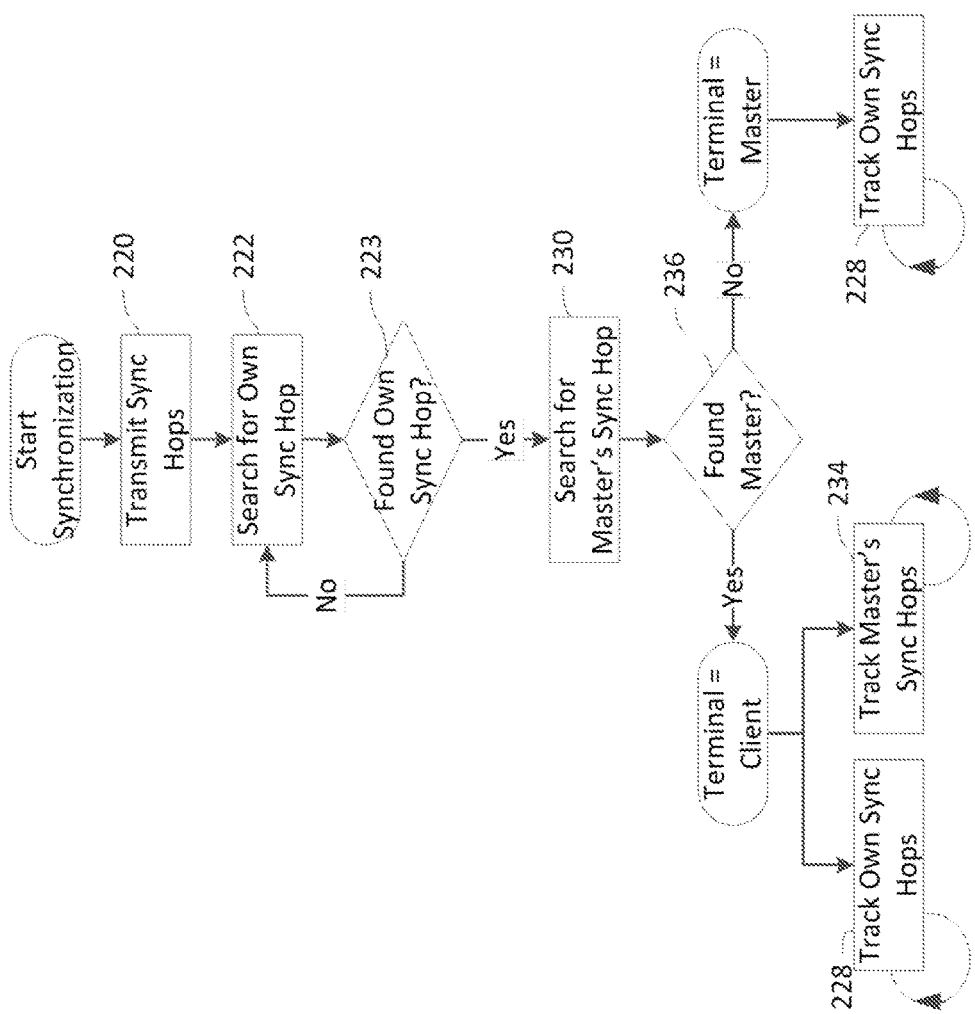
FIGS. 6A, 6B, and 6C are flowcharts illustrating methods for a client to track its own sync hops and master sync hops according to some embodiments of the present invention.

FIG. 6A illustrates one embodiment of the present invention in which each terminal searches for and tracks its own sync hops first, before searching for and tracking the master's sync hops. In operation 220, as described above, the terminal transmits sync hops and searches for the returns of those sync hops from the signal relay 100 in operation 222 until it finds it in operation 223. After finding its own sync hops, it searches for the master's sync hops in operation 230. In operation 236, if it finds the master, then the terminal begins tracking both its own sync hops in operation 228 and the master's sync hops in operation 234. On the other hand, if the terminal does not find the master, then the terminal assumes that it is the master and begins transmitting and tracking only its own sync hops in operation 228 during the master sync hop slots.

Figure 6B:
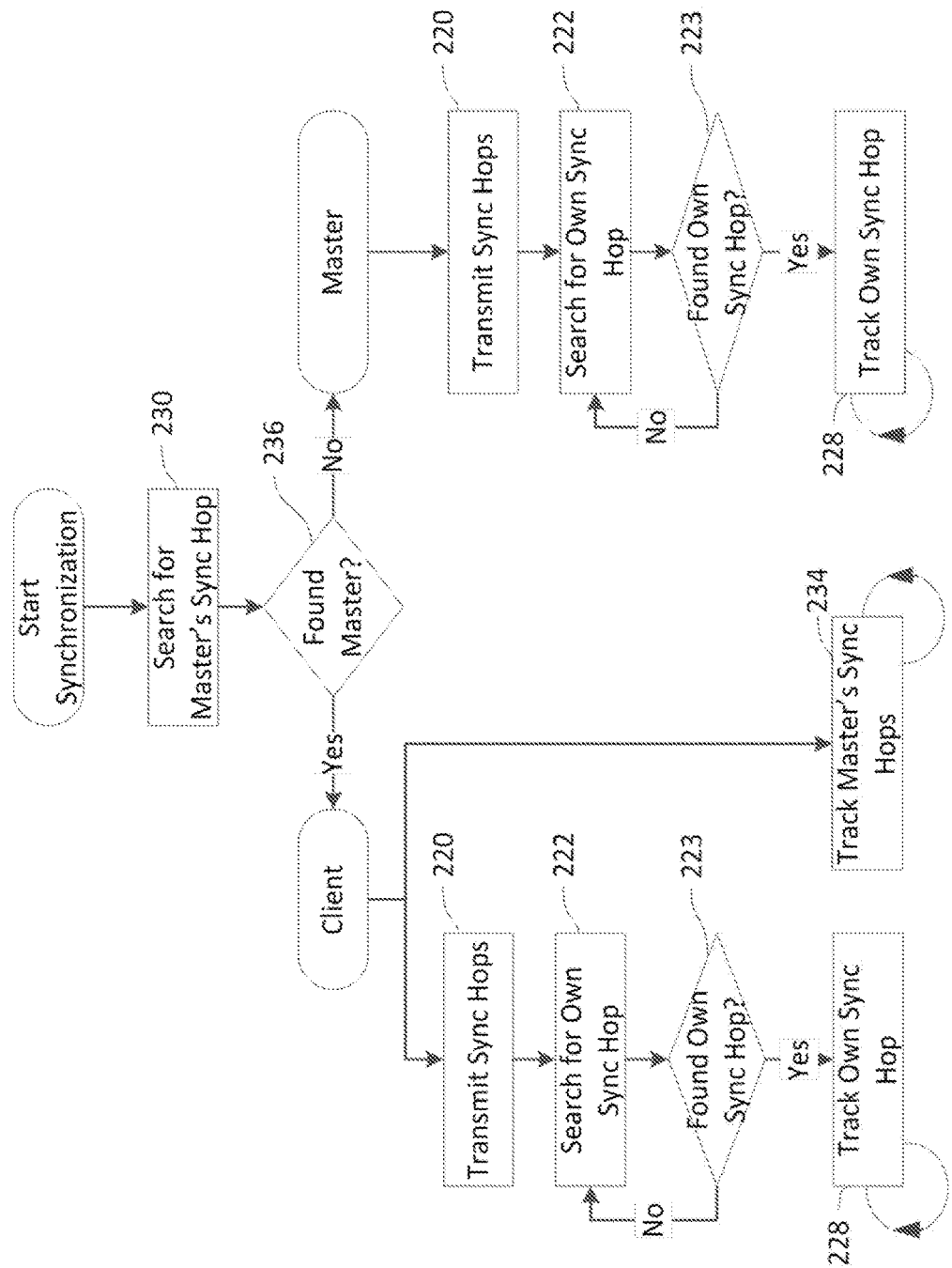

FIG. 6B illustrates another embodiment of the present invention in which each terminal searches for and tracks the master's sync hop first in operation 230 before searching for and tracking their own sync hop. If the terminal fails to find the master's sync hop in operation 236, then the terminal is a master terminal and begins transmitting sync hops in the master sync hop slots in operation 220, searching for returns of those sync hops from the signal relay 100 in operation 222 until it finds the sync hop in operation 223 and tracks its sync hops in operation 228. If the terminal does find the master's sync hop, then it is a client terminal. The client terminal begins tracking the master's sync hops in operation 234 and the client terminal transmits sync hops during its own sync hop slots in operation 220, searches for its own sync hop returns from the signal relay 100 in operation 222 until it finds its own sync hops in operation 223 and begins tracking its own sync hops in operation 228.

Figure 6C:
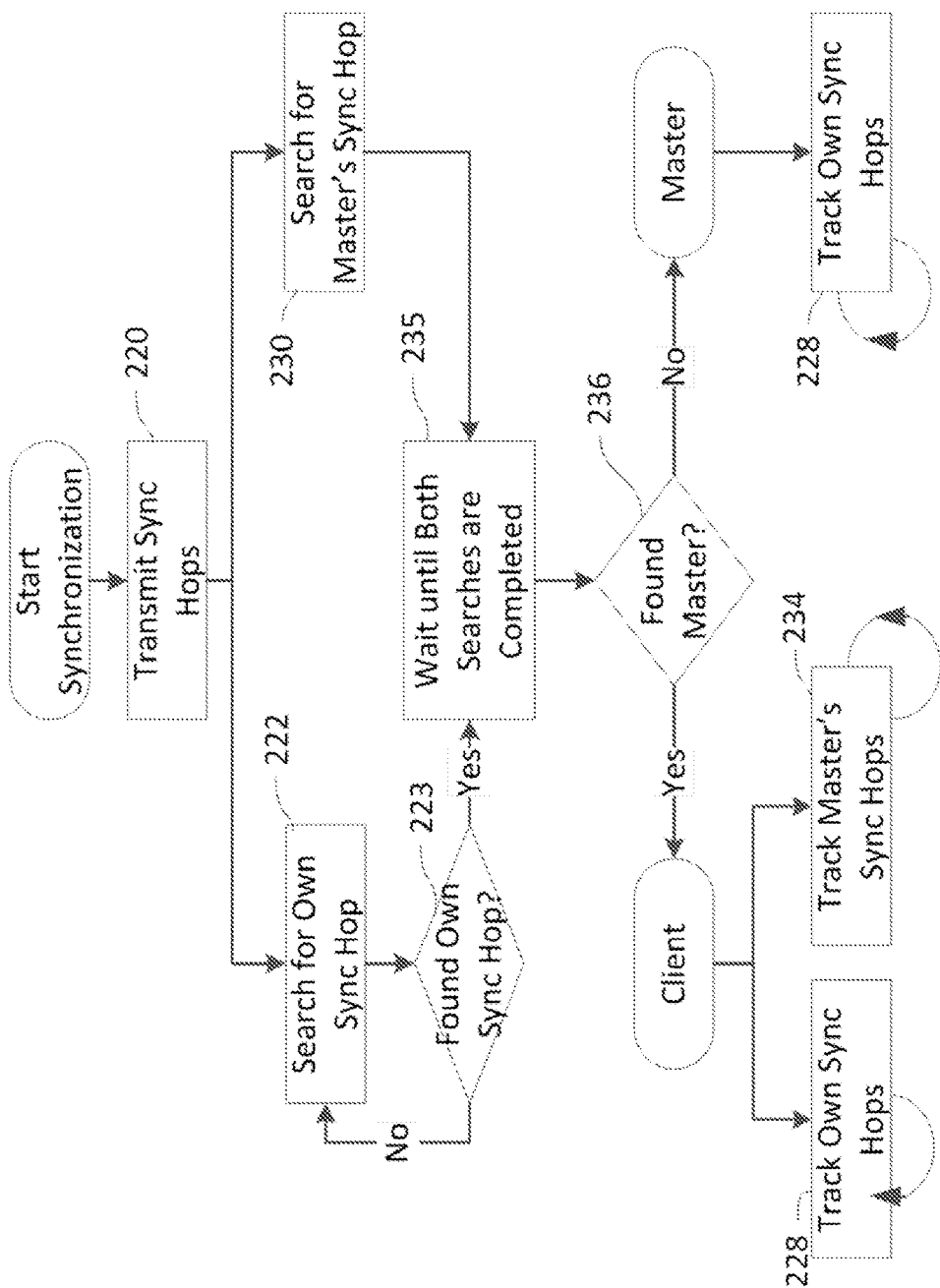

FIG. 6C illustrates still another embodiment of the present invention in which each terminal searches for both their own sync hop and the master's sync hop in parallel, and then tracks its own sync hop and the master's sync hops. In operation 220, the terminal transmits sync hops and searches for both a master's sync hop in operation 230 and its own sync hops in operation 222 and 223. When both searches are completed in operation 235, the terminal determines whether or not it has found a master sync hop in operation 236. If not, then the terminal is the master and it tracks only its own sync hops in operation 228. On the other hand, if the terminal does find a master sync hop then it is a client terminal and tracks both its own sync hops in operation 228 and the master sync hops in operation 234.

In some embodiments of the present invention, the order of acquisition varies depending on conditions. For example, if the client is rapidly undergoing range changes and the client time is far from the master then, in an arrangement where the client synchronizes its own sync hop before looking for the master (see, e.g., FIG. 6A), its own loopback could become stale while searching for master. Therefore, in such circumstances, synchronizing the master time before synchronizing its own sync hop (see, e.g., FIG. 6B) may result in better performance, assuming that the drift of the master time is slower than the range change of the client.

As such, embodiments of the present invention enable the synchronization of various terminals 120 in a network 10 without a system controller and without requiring an external time reference such as a GPS time reference. In embodiments of the present invention, modems can self-organize to establish a master virtual time reference that others can use. Modems can be used on moving platforms such as vehicles.

In addition, embodiments of the present invention can be adapted to add features such as dynamic communication resource allocation, if necessary.

While embodiments of the present invention are described above based on an assumption of operation on same beam, this may not be a restriction if there is sufficiently small payload or relay delay difference between beams or if any such delay difference is known and substantially constant.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

For example, in some embodiments of the present invention, different frequencies may be used to separate groups of terminals, thereby increasing the number of terminals that can be supported, where frequency channels hop together.

What is claimed is:

1. A method for synchronizing a time reference of a terminal clock of a terminal transceiver comprising an antenna and a modem, the method comprising:
   transmitting, by the modem, a terminal sync hop to a signal relay in accordance with the time reference;
   searching, by the modem, for a terminal sync hop return from the signal relay near an estimated terminal sync hop receive time;
   receiving, by the modem, the terminal sync hop return at a terminal sync hop receive time;
   searching, by the modem, for a master sync hop return from the signal relay;
   receiving, by the modem, the master sync hop return at a master sync hop receive time;
   calculating, by the modem, a time difference between the master sync hop receive time and the terminal sync hop receive time; and
   adjusting, by the modem, the time reference based on the calculated time difference.

2. The method of claim 1, wherein the adjusting the time reference based on the calculated time difference comprises changing, in a same direction, both a transmit time of the terminal sync hop and an estimated terminal sync hop receive time by the time difference.

3. The method of claim 1, wherein, after adjusting the time reference based on the calculated time difference, the terminal sync hop receive time is aligned with the master sync hop receive time.

4. The method of claim 1, further comprising estimating a range to the signal relay by:
   calculating a terminal sync hop delay between a transmit time of the terminal sync hop and the terminal sync hop receive time; and
   dividing the terminal sync hop delay by the speed of light.

5. The method of claim 1, further comprising adjusting the time reference when a range between the terminal and the signal relay changes by:
   detecting a change in a terminal sync hop delay where sync hop delay is the time from when the sync hop is transmitted by the terminal to the time when the same sync hop is received by the terminal; and
   adjusting the time at which the terminal sync hop is transmitted and the estimated terminal sync hop receive time, in opposite directions, by half the change in the terminal sync hop delay.

6. The method of claim 1, wherein the searching for the terminal sync hop return occurs before the searching for the master sync hop return.

7. The method of claim 1, wherein the searching for the master sync hop return occurs before the searching for the terminal sync hop return.

8. The method of claim 1, wherein the searching for the master sync hop return occurs concurrently with the searching for the terminal sync hop return.

9. A modem comprising:
   a network communication interface;
   a terminal time tracking loop configured to track a terminal time reference;
   a master time tracking loop configured to track a master time reference;
   a signal processor coupled to memory, the memory storing instructions that, when executed by the signal processor, cause the signal processor to:
      transmit, by the network communication interface, a terminal sync hop in accordance with a time reference;
      search for a terminal sync hop return near an estimated terminal sync hop receive time;
      receive, by the network communication interface, the terminal sync hop return at a terminal sync hop receive time;
      track the terminal time reference using the terminal time tracking loop in accordance with the terminal sync hop receive time;
      search for a master sync hop return;
      receive, by the network communication interface, the master sync hop return at a master sync hop receive time;
      track the master time reference using the master time tracking loop in accordance with the master sync hop receive time;
      calculate a time difference between the master sync hop receive time and the terminal sync hop receive time; and
      adjust the terminal time reference tracked by the terminal tracking loop based on the calculated time difference.

10. The modem of claim 9, wherein the signal processor is configured to adjust the terminal time reference based on the calculated time difference by changing, in a same direction, both a transmit time of the terminal sync hop and the estimated terminal sync hop receive time.

11. The modem of claim 9, wherein, after the terminal time reference is adjusted, the terminal time reference and the master time reference are aligned.

12. The modem of claim 9, wherein the modem receives the terminal sync hop return from a signal relay, and
wherein the memory further stores instructions that, when executed by the signal processor, cause the signal processor to estimate a range to the signal relay by:
calculating a terminal sync hop delay between a transmit time of the terminal sync hop and the terminal sync hop receive time; and
dividing the terminal sync hop delay by the speed of light.

13. The modem of claim 9, wherein the memory further stores instructions that, when executed by the signal processor, cause the signal processor to adjust the terminal time reference when a range between the terminal and the signal relay changes by:
detecting a change in a terminal sync hop delay between a transmit time of the terminal sync hop and the terminal sync hop receive time; and
adjusting the time at which the terminal sync hop is transmitted and the estimated terminal sync hop receive time, in opposite directions, by half the change in the terminal sync hop delay.

14. The modem of claim 9, wherein the modem is configured to search for the terminal sync hop return before it searches for the master sync hop return.

15. The modem of claim 9, wherein the modem is configured to search for the terminal sync hop return after it searches for the master sync hop return.

16. The modem of claim 9, wherein the modem is configured to search, concurrently, for both the terminal sync hop return and the master sync hop return.

17. A communication system comprising:
a signal relay;
a master modem comprising a master network communication interface, a master time tracking loop configured to track a master time reference, and a master signal processor coupled to first memory, the first memory storing instructions that, when executed by the master signal processor cause the master signal processor to:
transmit to the signal relay, by the master network communication interface, a master sync hop in accordance with the master time reference;
search for a master sync hop return near an estimated master sync hop receive time;
receive from the signal relay, by the master network communication interface, the master sync hop return at a master modem master sync hop receive time; and
track the master time reference based on the master sync hop receive time; and
a client modem comprising a client network communication interface, a client time tracking loop configured to track a client time reference, a master time tracking loop configured to track the master time reference, and a client signal processor coupled to second memory, the second memory storing instructions that, when executed by the client signal processor cause the client signal processor to:
transmit to the signal relay, by the client network communication interface, a client sync hop in accordance with the second time reference;
search for a client sync hop return near an estimated client sync hop receive time;
receive from the signal relay, by the client network communication interface, the client sync hop return at a client sync hop receive time;
track the second time reference based on the second sync hop receive time;
search for the master sync hop;
receive from the signal relay the master sync hop at a client modem master sync hop receive time;
track the master time reference based on the client modem master sync hop receive time;
calculate a time difference between the client sync hop receive time and the client modem master sync hop receive time; and
adjust the second time reference based on the calculated time difference.

18. The communication system of claim 17, wherein the client signal processor is configured to adjust the client time reference based on the calculated time difference by changing, in a same direction, both a transmit time of the client sync hop and the estimated client sync hop receive time.

19. The communication system of claim 17, wherein the first memory further stores instructions that, when executed by the master signal processor, cause the master signal processor to:
detect a change in a master sync hop delay between a transmit time of the master sync hop and the master modem master sync hop receive time; and
adjust a transmit time of the master sync hop and the estimated master sync hop receive time, in opposite directions, by half the change in the master sync hop delay.

20. The communication system of claim 17, wherein the client modem is configured to adjust the client time reference based on the calculated time difference by changing, in a same direction, both a transmit time of the client sync hop and the estimated client sync hop receive time.

* * * * *